C. A. MILLER.
CONVEYER FOR BOTTLE WASHING MACHINES.
APPLICATION FILED JUNE 22, 1914.
1,181,912.
Patented May 2, 1916.
2 SHEETS—SHEET 2.
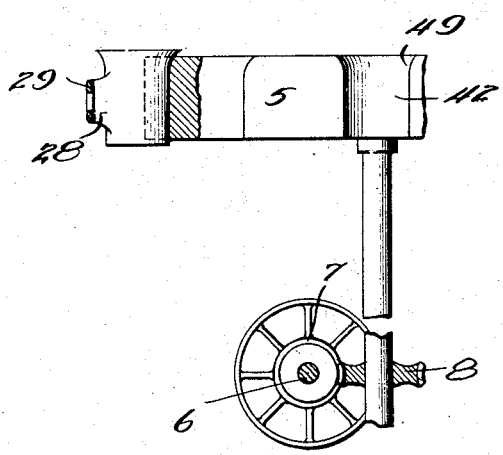
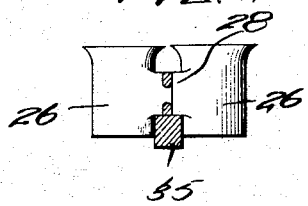
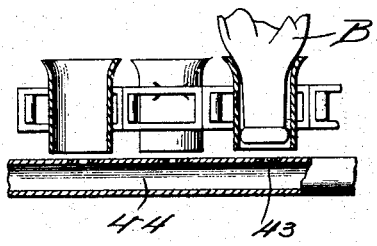
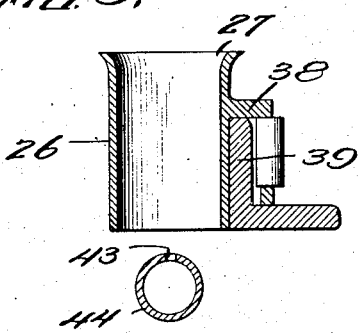
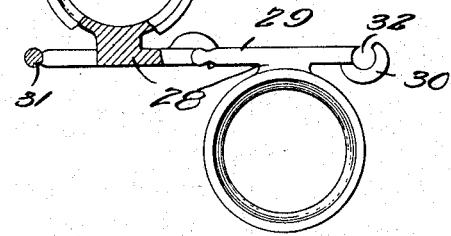
Inventor
Charles A. Miller,
By Mason Fenwick & Lawrence,
Attorneys
Witnesses

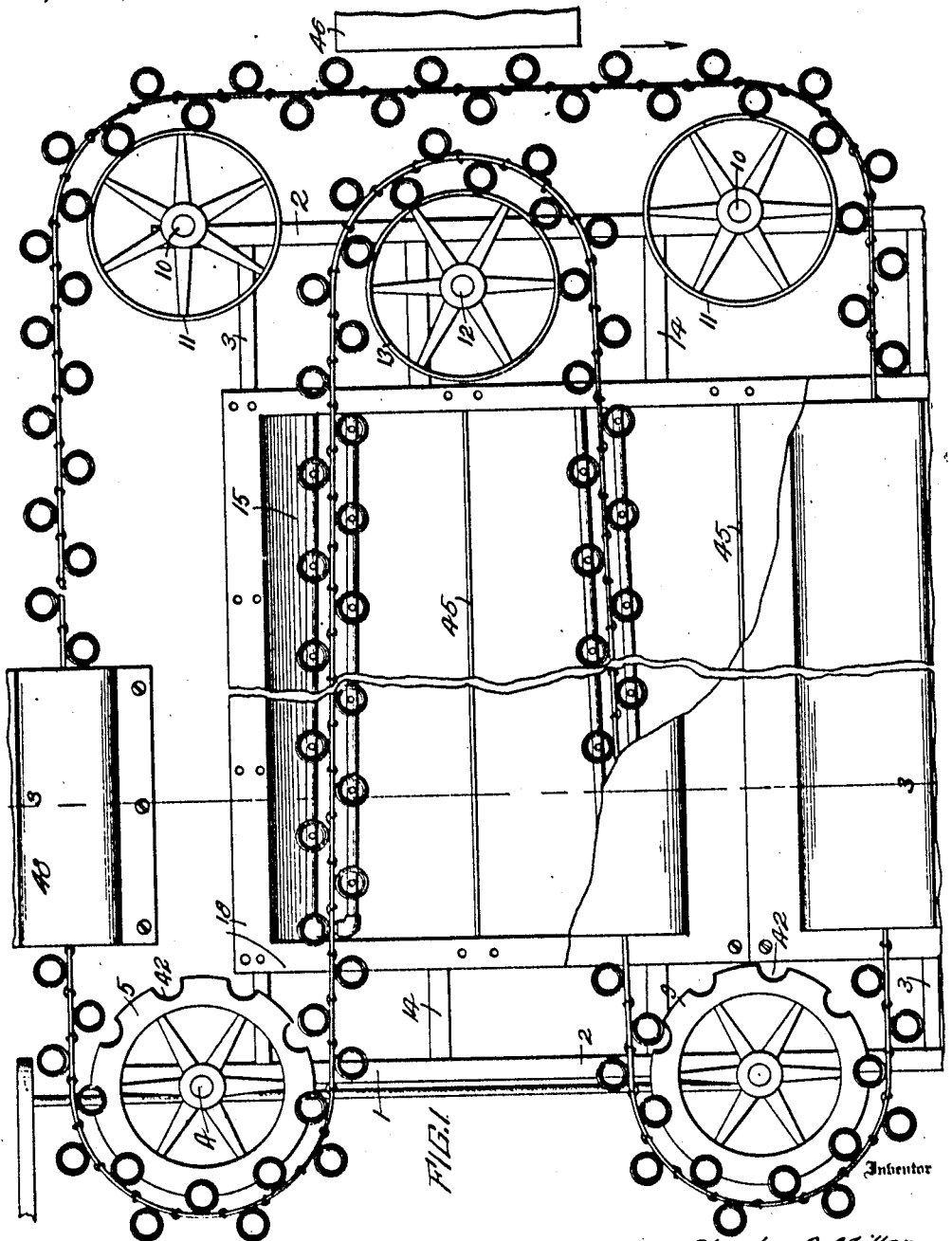

UNITED STATES PATENT OFFICE.

CHARLES ALVIN MILLER, OF BAINBRIDGE, GEORGIA, ASSIGNOR TO MILLER MANUFACTURING COMPANY, OF BAINBRIDGE, GEORGIA, A CORPORATION OF GEORGIA.

CONVEYER FOR BOTTLE-WASHING MACHINES.

1,181,912.   Specification of Letters Patent.   Patented May 2, 1916.

Application filed June 22, 1914. Serial No. 846,710.

*To all whom it may concern:*

Be it known that I, CHARLES A. MILLER, a citizen of the United States, residing at Bainbridge, in the county of Decatur and State of Georgia, have invented certain new and useful Improvements in Conveyers for Bottle-Washing Machines; and I do hereby declare the following to be a full, clear, and exact description of the invention, such as will enable others skilled in the art to which it appertains to make and use the same.

This invention relates to conveyers, and more especially to those of that type which include an endless belt and article holders or cups thereon; and the object of the same is to adapt the cups in size and shape for the support of bottles in inverted position so that they may be washed and rinsed, and to so shape and locate the driving wheels and idler wheels as to coact with the belt and cups and maintain the bottles upright. In carrying out this general idea the invention also employs a framework with shafts for supporting the various wheels, a power shaft for rotating the driving shafts in unison, and housings for containing the washing and rinsing mechanism and through which certain stretches of the belt are led forward and backward in a sinuous course.

My preferred manner of carrying out the invention is described below and shown in the drawings wherein:

Figure 1 is a plan view of the entire machine, the hood of one housing being omitted, that of the next broken away, and that of the third housing in place. Fig. 2 is a partial section through one of the driving wheels, and a detail of the worm mechanism for rotating its shaft. Fig. 3 is a plan view partly broken away showing how the cups are supported by the links of the chain belt. Fig. 4 is a cross section through the chain belt and the track for supporting it. Fig. 5 is a cross section through a modified form of belt and track and the spray pipe beneath it, and Fig. 6 is a fragmentary longitudinal section through two of the cups of the belt and the spray pipe, omitting the track.

As above suggested, the conveyer forming the subject-matter of the present invention is intended primarily for use in carrying inverted bottles through a casing or casings which contain washing and rinsing mechanisms of that type in which the liquid is jetted upward into the open mouths of the bottles to wash the interior thereof, and may also be simultaneously applied to the exterior in any suitable way. No claim is made in the present case to any details of the washing or rinsing mechanisms, but the use to which this conveyer is put cannot be lost sight of and its construction is especially adapted to such use.

Referring to the drawings, the numeral 1 designates generally the framework having front and rear members 2 connected by side members 3. Mounted in suitable bearings on the rear member are upright driving shafts 4 (two being shown in Fig. 1) to which are secured driving sprocket wheels 5 and 9. These shafts and wheels are rotated in unison and in the same direction by suitable means, herein shown as a horizontal power shaft 6 carrying worms 7 which mesh with worm gears 8 on the driving shafts 4 as seen in Fig. 2. However, the power might be applied to only one of the driving sprockets or if the machine were larger and more of such sprockets were employed the power might be applied to all of them. I will describe the left end of Fig. 1 as the rear of the machine and the right as the front.

Mounted in suitable bearings at the front of the framework are upright shafts 10 and 12, and in the present illustration the shaft 12 stands between the other two shafts and slightly further to the rear, and these shafts respectively carry smooth faced idler wheels 11 near the corners of the framework and an intermediate smooth faced idler wheel 13 as shown. Supported on beams 14 within the framework is a housing consisting of a tank 15 divided by partitions 45 into sections, and the sections are covered by hoods as indicated at 20 and 21, their flanges 22 being secured by screws 23 or otherwise to the flange 18 of the tank. Within the several sections of this housing are disposed pipes 44 having perforations 43 in their upper sides so that they will project jets upward for cleaning the bottles as described below, and these pipes are supplied with a suitable cleaning liquid by means not necessary to amplify. In addition to the main housing shown in Fig. 1 as mounted on the beams 14, there may be another housing broadly indicated by the numeral 48 and which is to contain the rinsing mechanism which is distinguished from the washing mechanism in that the bottles will usually be washed with hot water containing a caustic solution, whereas they will usually be rinsed with cold clear water. The front and rear ends of the hoods over the housings will be left open so that the carrier belt hereinafter described may pass forward and backward through the same, and the bottles in those stretches passing through the sections of the tank 15 are washed, whereas the bottles in that stretch passing through the rinser 48 are rinsed.

The belt forming part of this conveyer may be in several forms, but herein I have shown only two—the first being illustrated in Figs. 1, 2, 3 and 4, and the second being illustrated in Fig. 5. The belt itself is a chain such as commonly used on sprocket wheels and the like, and it comprises rectangular links 29, each having a hook 30 at one end and a reduced neck 31 at the other end over which the throat 32 of the hook may be passed, whereby the links are separably but pivotally connected in a well-known manner. The peculiarity of this belt lies in the fact that its links carry and are preferably formed integral with lugs 28 shaped as best seen in Figs. 2 and 4 and projecting laterally from the chain, and the outer end of each lug carries and is preferably merged integrally into an article holder in the shape of a cup. As this device is by preference used for carrying bottles, said cup preferably has an upright cylindrical body 26 open at top and bottom, and the upper end of this body is flared internally and externally as shown at 27. The size of the body is such that it fits within notches 42 in the periphery of either driving sprocket, and the upper ends of these notches are flared as at 49 to receive the flared upper ends 27 of the cups. The latter in turn receive the inverted bottles as indicated at B in Fig. 6, and this view shows how the mouths of the bottles pass over the perforations 43 in the spray pipes 44.

The lugs 28 project alternately from the links on opposite sides of the chain as best seen in Figs. 1, 3 and 6, and to an extent the cups 26 with their contents counterbalance each other as seen in Fig. 4; but in a simpler form of this conveyer it may be desirable to have the cups on only one side of the chain, and in that case lugs 38 are employed connecting the cups with the links as best seen in Fig. 5. In the double form best seen in Fig. 4 a bar or track 35 preferably extends across the tank 15 and underlies the section of belt therein, and the lower edges of the lugs 28 slide on this track while the inner faces of the cups 26 slide against its sides. With the construction shown in Fig. 5, this track may be an angle iron having its upright leaf 39 underlying lug 38 and standing between the chain and the body of the cup, which body yet slides against the side of the track while the lug 38 slides upon it. In this case the weight of the chain partly counterbalances the load within the cups, but the shape of the lug 38 permits of a larger track being used. The track may be employed when the distance between the sprockets and idlers is considerable, but I do not wish to be limited to its use.

When this improved conveyer is employed for washing bottles as illustrated herewith, the bottles will be taken from a table 46 at the front of the machine and applied to the cups in the belt which is moving in the direction of the arrow. Any given bottle passes first under hood 21, then around the sprocket 9 and under the hood 20, then around the intermediate idler 13 and through the remaining section of the housing whose hood has been removed in the drawings, and during its several trips to and fro through the housing the bottle is repeatedly washed by jets thrown up through the perforations 43 of the spray pipes 44, as the tubular structure of the bottle cups 26 permits the spray or jets to enter the bottle mouths and also prevents the trapping of the liquid within the cups. Finally the bottle passes around the sprocket wheel 5 and through the housing 48 where it is rinsed in clear water, and at some point beyond said housing an operator takes the washed bottle off the carrier. If he should discover that any given bottle is not thoroughly cleaned by this time, he has but to leave it on the carrier when it travels again through the course outlined and is washed and rinsed a second time. Meanwhile the operator adjacent the table 46 sees this cup full and will act accordingly.

The provision of a double series of cups disposed in staggered relation along the chain not only causes the bottles in a measure to balance each other with or without the use of a track, but also utilizes more space on the chain belt for the carriers than could be utilized if the carriers were all on one side. In that case they would have to be smaller, or the links larger, or the carriers connected with every other link. The use of smooth-faced idler wheels permits the passage of the belt and the contact of either the faces of its links or the bodies of its cups; and in the arrangement illustrated in Fig. 1, where stretches of the belt pass forward and backward within the housing, I find it advantageous to have all the idler wheels at the front of the framework and to set the intermediate wheel a little to the rear of a line between the other two, so that the parts of the belt moving in opposite directions will not interfere with each other.

What I claim is:

1. In combination, a plurality of sprocket wheels mounted on upright axes and having peripheral rounded notches, a belt passing around said wheels, and a series of conveyer elements carried by the belt, each element having an upright cylindrical body adapted to enter a notch and its upper end externally flared to a size larger than its body, for the purpose set forth.

2. In combination, a plurality of sprocket wheels mounted on upright axes and having peripheral rounded notches, a chain belt passing around but out of contact with said wheels, and a series of conveyer elements carried by links of the belt, each element having an upright cylindrical body adapted to enter a notch and its upper end larger than its body, for the purpose set forth.

3. In combination, a sprocket wheel mounted on a vertical axis and having peripheral notches larger at the upper than at the lower side of the wheel, a belt, and a series of conveyer elements carried by and laterally offset from the belt and shaped to complement said notches.

4. In combination, a plurality of sprocket wheels mounted on upright axes and having peripheral rounded notches flared at the upper sides of the wheels, a chain belt passing around said wheels, and a series of conveyer cups laterally offset from and carried by said belt at intervals to register with said notches, each cup having a cylindrical hollow body internally and externally flared at its upper end so as to complement any notch.

5. In combination, a driven sprocket having formed in the periphery thereof a plurality of notches, the upper portions of which are enlarged and flared, a chain, and a plurality of cups extending from said chain and formed complementarily with respect to the notches of said sprocket and adapted to enter them as the sprocket is driven.

6. In a conveyer, a horizontal chain belt standing on edge, and cups carried by its links and on alternately opposite sides thereof; combined with wheels for said belt, each having peripheral notches to receive one series of cups.

7. In a conveyer, a horizontal chain belt standing on edge, and cups carried by its links and on alternately opposite sides thereof, the cups being externally enlarged at their upper ends; combined with wheels for said belt, each mounted on a vertical axis and having peripheral notches to receive the bodies of one series of cups while the enlarged portions of said cups stand above the wheel.

8. In combination, a plurality of sprocket wheels mounted on upright axes and having peripheral rounded notches flared at the upper sides of the wheels, a chain belt passing around said wheels, and two series of conveyer cups laterally offset from the opposite sides of said belt and disposed in staggered relation to each other with those of each series at intervals to register with said notches in one of the wheels, each cup having a cylindrical hollow body internally and externally flared at its upper end so as to complement any notch.

9. In a conveyer, a horizontal belt standing on edge, and two series of conveyer elements carried by and on opposite sides of the belt and disposed in staggered relation to each other; combined with a driving sprocket wheel having its periphery notched to receive the elements of one series, and idler wheels having smooth peripheries over which pass the elements of both series.

10. In a conveyer, a horizontal chain belt standing on edge, and cups carried by its links and on alternately opposite sides thereof; combined with wheels whose peripheries are shaped to engage one series of cups, and a track along whose upper edge the chain travels while the cups of both series slide along its sides.

11. In combination, a plurality of sprocket wheels mounted on upright axes and having peripheral notches flared at the upper sides of the wheels, a plurality of idler wheels having smooth peripheries, a belt passing to and fro around all said wheels, and two series of conveyer cups laterally offset from the opposite sides of said belt and disposed in staggered relation to each other with those of each series at intervals to register with said notches, each cup being flared at its upper end so as to complement any notch.

In testimony whereof I affix my signature in presence of two witnesses.

CHARLES ALVIN MILLER.

Witnesses:
M. E. NUSSBAUM,
CHAS. V. PERRY.